INVENTORS
HENRI GUTTON AND
SYLVAIN BERLINE
ATTORNEY.

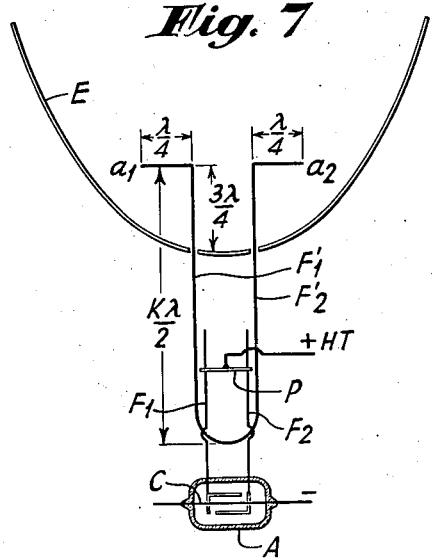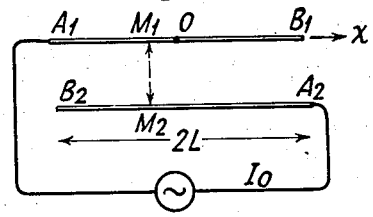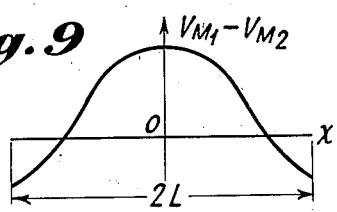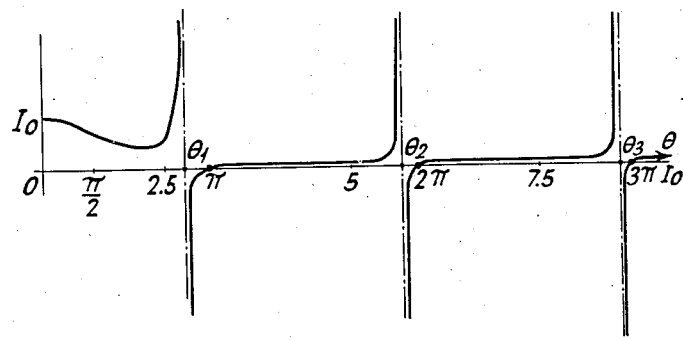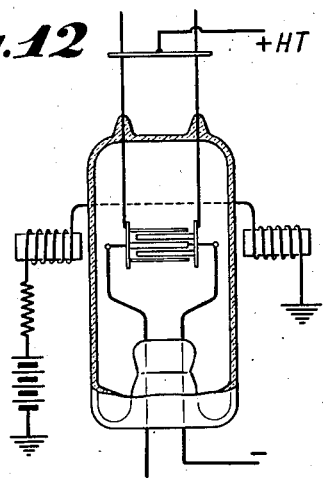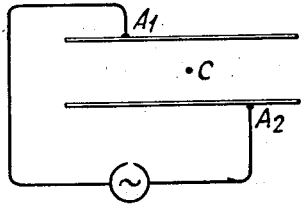

Patented Feb. 14, 1939

2,147,159

UNITED STATES PATENT OFFICE 2,147,159

MAGNETRON OSCILLATOR AND DETECTOR

Henri Gutton and Sylvain Berline, Paris, France, assignors to Compagnie Generale de Telegraphic Sans Fil, a corporation of France Application April 15, 1938, Serial No. 202,183
In Germany April 17, 1937

4 Claims. (Cl. 250—36)

The present invention concerns a device for producing continuous oscillations of ultra-short wave length; say, of the order of a centimeter.

It is known in the art that where such extremely short waves are dealt with the interelectrode capacitances in generator or oscillator tubes tend to neutralize the potential differences, and thus preclude all attempts to maintain and sustain the oscillations. It has heretofore been necessary on this ground to use tubes of reduced dimensions and it has been difficult to realize sufficiently large powers even with multiple electrodes comprising several elements connected in parallel.

Now, according to the invention the adverse effect of inter-electrode capacitance is eliminated by oscillatory circuits or electrodes in the form of twin conductors which are fed not in their middle as has heretofore been the general practice, but at the ends furthest removed one from the other.

It is thus feasible to use systems comprising electrodes having rather large proportions in contrast to the wave lengths that are used.

Incorporated more particularly in a magnetron, the invention permits of reducing the intensity of the magnetic field while lowering the anode potential. Furthermore, it is possible to increase the electrode areas, as well as the number of anode segments.

In the case of oscillator tubes having a high potential grid and a retarding field electrode, and more generally speaking in oscillator, amplifier, or detector circuit organizations working with very short waves, the present invention offers similar advantages.

The invention will be better understood from the following detailed description thereof by reference to the appended drawings wherein—

Fig. 7 shows a preferred circuit arrangement including a paraboloidal reflector in association with a directive antenna;

Figs. 8, 9 and 10 are referred to hereinafter for demonstrating the basic theory of our invention;

Fig. 11 shows a circuit arrangement which still further illustrates the theory; and Fig. 12 shows in a detailed manner a preferred form of construction and embodiment of a magnetron discharge tube according to our invention.

Our invention aims to be a contribution to the art of operating a magnetron for producing or detecting ultra-short waves. Such art is, for instance, of the kind described by E. G. Linder in Proceedings of the Institute of Radio Engineers, April, 1936, pp. 633 et seq.

The known magnetrons comprise essentially a double-split anode consisting of two cylindrical shells $A_1$ and $A_2$ surrounding a cathode and placed within a magnetic field which is parallel to the latter. Suitable end plates are provided which serve to correct the distribution of the electric field.

Figure 1:
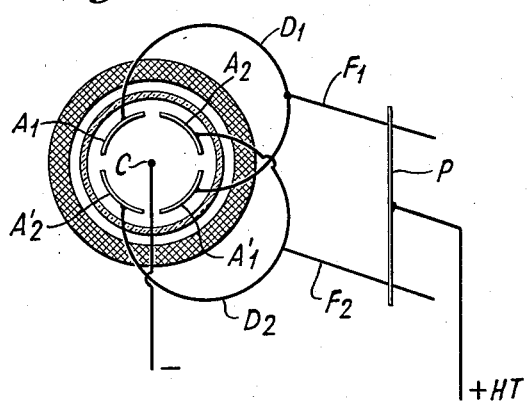
Figure 1 illustrates a tuned circuit arrangement connected to the anode segments of a magnetron discharge tube according to our invention.

Referring to Fig. 1, it will be noted that the positive potential which is impressed upon the anodes by the bridge P and two Lecher wires $F_1F_2$ feeds these anodes in the middle, in line with an arrangement which has been customarily used in the past.

With a view to diminishing the wave length, the anode is split into four segments $A_1$, $A_1'$, $A_2$, $A_2'$ which are connected in parallel by the resonant loops $D_1D_2$ with the Lecher wires $F_1F_2$. Also in this case the anode segments are connected in the middle through the bridge P with the positive terminal of the anode potential source.

Figure 2:
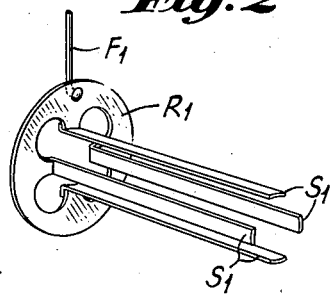
Figs. 2, 3 and 4 show in perspective and in section a novel structure to which the electrodes of the magnetron discharge tube may be conformed in carrying out our invention.
Figure 3:
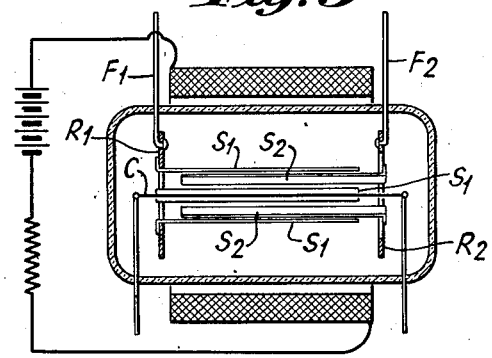
Figure 4:
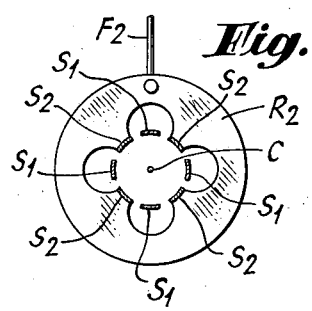

Figs. 2, 3 and 4 show in perspective and in section the anode of a magnetron designed in accordance with this invention. This anode comprises two similar elements, each of the latter consisting of a terminal disk or ring $R_1$ and $R_2$, respectively, being at right angles to the axis of filament C and supporting at right angles a certain number of cylindrical segments $S_1$ and $S_2$ respectively, and being parallel to the latter. The two anode elements $A_1$ and $A_2$ are mounted opposite each other at the two ends of the filament C in such a way that their segments overlap. Each of the said two anode elements consists of four segments, though it will be understood that any other convenient number could be chosen. The free end of each of the segments, as shown in the drawings, stops (or is cut off) a little distance in front of the terminal ring of the other anode element, though it is possible to extend the same beyond the latter, as shall later be shown.

According to the invention, and contra-distinct to the arrangements known in the prior art, the two elements are fed with D. C. potential by the Lecher wires $F_1$ and $F_2$, not in the center of their cylindrical segments, but rather at one of their terminal ends and at respectively opposite points, to be more precise, in a practical arrangement by way of the annular plates $R_1$ and $R_2$ which form equipotential connections.

Figure 5:
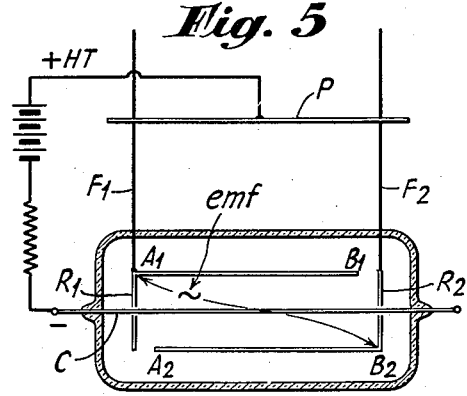
Fig. 5 shows a modified arrangement of the electrodes within the magnetron discharge tube.

In a more schematic way, presupposing for each of the two anode elements only a single segment, the essential element of a magnetron according to the invention could be represented in a very simplified manner as in Fig. 5.

Referring to Fig. 5, there are simply shown at $A_1B_1$ and $A_2B_2$ two of the anode elements of a magnetron, while $R_1$ and $R_2$ denote their terminal rings, $F_1$, $F_2$ the Lecher wires, and P the bridge which connects them with the source of positive potential, the other terminal thereof being united with the cathode C.

For the sake of simplification of the illustration, the magnetic field parallel to cathode C has not been indicated. However, by dash lines an alternator is schematically indicated to denote the E. M. F. of the ultra-high frequency which is set up across the elements of the magnetron by the very operation of the latter.

The essential action and fact which constitutes the object of the present invention is that such a magnetron when fed at its two opposed ends is adapted to generate stable oscillations of a frequency far higher and far more powerful than where the anode elements are fed in their middles.

Figure 6:
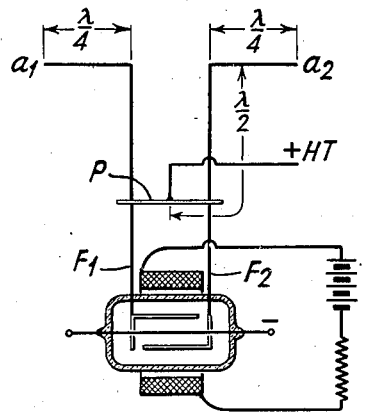
Fig. 6 is a schematic circuit arrangement which is referred to in explaining the theory of operation.

This magnetron may work, for instance, upon an antenna $a_1a_2$, and this antenna may consist either of extensions of the very Lecher wires $F_1F_2$ (Fig. 6) or else of a clip or loop $F'_1F'_2$ being in inductive coupling relation with the said Lecher wires (Fig. 7), in line with schemes well known in the earlier art.

For the sake of argument, there are further indicated in Fig. 7, at A, the bulb or vessel of the magnetron, and at E a reflecting screen being, for instance, of paraboloidal form designed to impart directivity to the pencil or beam of energy which is radiated off, as also known in the art.

With arrangements of this kind it is noted more particularly that the tube oscillates under stable conditions and generates a large volume of energy at a well defined wave length which is a function of the dimensions and of the spacing apart of the anode elements, while yet being independent of the position of the bridge piece P disposed between the Lecher wires. By shifting the bridge only the amount of energy fed into the aerial will be varied.

A plausible and satisfactory explanation of the operation of tubes according to the invention, as has been indicated above, appears to be that the mode of connecting the anode elements at their two extreme and opposite ends suppresses, for certain privileged frequencies, that is, the frequencies of the resultant oscillations, the parasitic or spurious effect of internal capacitance.

As a matter of fact, the results which have been obtained according to the invention are explainable by a simple calculation to be outlined by way of example in what follows.

To make these calculations the assumption is made as represented in Fig. 8 that a source of E. M. F. of high frequency of this form $$U = U_0 \cos \omega t$$

feeds a double line $A_1B_1A_2B_2$ at its two opposite ends.

Starting with the equation of propagation in the line $$a^2 \cdot \frac{\partial^2 V}{\partial x^2} = \frac{\partial^2 V}{\partial t^2}$$

and introducing the condition at the ends, it is found that the feed current of such a circuit is of the following form:

$$I = 2caU_0 \frac{\sin \theta}{\cos \theta + \theta \sin \theta} \sin \omega t$$

where $$\theta = \frac{\omega L}{a}$$

$a$ being a function of the inductance and of the capacity of the line, $c$ being the specific capacity per unit of length of the line, and L the length $A_1B_1 = A_2B_2$.

For the sake of simplification there has been neglected in this formula the damping due to the resistances of the circuits. It shows that the current I is always in quadrature relation to the potential U. Hence, the circuit behaves like a capacity when the amplitude of the current $$I = 2caU_0 \frac{\sin \theta}{\cos \theta + \theta \sin \theta}$$

is positive, and like an inductance when I is negative. The graph showing I as a function of $$\theta = \frac{\omega L}{a}$$

is shown in Fig. 10.

For a given line, L and $a$ are defined, and $\omega$ varies as $\theta$. When the frequency is low, this current diminishes, passes a minimum value for $\theta = 2.3$, then grows indefinitely for cotan $\theta = -\theta$, in other words, for $\theta = 2.82$, because the attenuation has been assumed to be zero. For this value, the current reverses its phase, and the line behaves like a series resonance circuit or resonant circuit.

For $\theta = \pi$ current I becomes zero and the impedance of the line infinitely high so that the circuit then behaves like an anti-resonant (or parallel resonance) circuit.

If the frequency continues to grow values of S in infinite number are found again for which $\theta = -\cotan \theta$ (for all of these values the amplitude of the current will become infinitely large), and others also infinite in number for which $\theta = k\pi$ (the amplitude of the current then becoming zero, with the line presenting infinite impedance).

Taking the origin O of the coordinates to be in the middle of the line, and denoting by $x$ the abscissa of point $M_1$ on the axis directed along $Ox$, the difference of potential between two points opposite $M_1$, $M_2$ of the line will be given by the equation $$V_{M_1} - V_{M_2} = -\frac{U_0}{\cos \theta + \theta \sin \theta} \cos \frac{\omega x}{a} \cos \omega t$$

The amplitude of the potential difference at each point is thus a function of the abscissa and is expressible by $$-\frac{U_0}{\cos \theta + \theta \sin \theta} \cdot \cos \frac{\omega x}{a}$$

For $x=0$, that is to say, in the middle of the circuit, this amplitude will reach a maximum magnitude.

Fig. 9 represents the value $V_{M_1} - V_{M_2}$ along the line.

For $$\theta = \frac{\omega L}{a} = k\pi$$

crest amplitudes arise at the two ends $A_1$ and $B_1$.

For $\theta = -\cotan \theta$, that is to say, in the presence of resonance, the amplitude of the pd would become infinite, if the above assumption be made again.

Hence, it will be seen here that for the two values $\theta = -\cotan\theta$ and $\theta = k\pi$ the capacity between the electrodes disappears in the formulae.

For the value $\theta = k\pi$ in particular the capacity between the electrodes does not arise or occur at all; and it is this very fact, as pointed out above, which makes it feasible to maintain ultra-short waves with the aid of circuits presenting comparatively large dimensions.

A circuit of the kind which is represented in Fig. 11 where the outputs are not disposed at the ends of the line, but rather at any desired points $A_1$, $A_2$ at all which are symmetric in reference to center $c$ thereof, would moreover present similar properties.

We have ascertained that it is fairly feasible to maintain oscillations under definite conditions both as regards the magnetic field and potential. With all reservations, we venture to advance the following as a plausible explanation:

Assuming an electron having been issued from the space charge which surrounds the filament, and if the assumption be made that the magnetic field reaches the blocking value, this electron will, over a fairly long trajectory or path, stay tangent to the anode circumference. Its speed will then be:

$$v = \sqrt{\frac{2e}{m}V}$$

where $e$ the charge of the electron, $m$ its mass, and $V$ the D. C. anode potential.

The electron will successively fly past each anode plate, and the length of this trajectory between the middles of two consecutive plates will be:

$$\tau = \frac{\pi d}{2nv}$$

where $d$ the diameter of the anode cylinder.

Without entering into details of the calculation, it may be held that if there is superposed upon the steady or constant electric field, an RF field between two consecutive plates, then the electron, by virtue of such speed as it may have acquired, may be gathered or "captured" by the plate at the lowest potential. At that instant it will yield power to the external circuit.

This condition is realized if the duration of the trajectory is near, but less than a half-period. Satisfactory oscillation conditions are obtained for $$\tau \approx \frac{T}{2.6}$$

For a given anode diameter, for a given number of electrons, and a definite anode potential, the length of the c. w. will then be well defined. On the other hand, the magnetic field has a value which corresponds to the inflow (arrival) of electrons tangentially to the anode. This value is called the blocking field of the magnetron for potential V. Its value is $$H_{b_1} = 6.7\sqrt{\frac{V}{r}}$$

where H in terms of Gauss, V in volts, and $r$ the radius in centimeters.

In the case of a magnetron constructed as hereinbefore described, if the period corresponding to the transit time ($T = 2.6\tau$) is equal to the period of resonance of the circuit, it is found in practice that a c. w. of well defined frequency will be maintained, while all other frequencies, both lower and higher will not be maintained.

Fig. 12 shows in a detailed manner a form of construction and embodiment of a magnetron according to this invention.

By way of example, there shall hereinbelow be cited the characteristic data of two magnetrons (arbitrarily called 1 and 2) designed in accordance with the present invention. For the sake of comparison, the corresponding data of a magnetron of the type suggested by E. G. Linder have been indicated, this magnetron comprising an anode divided into two segments in their middle, with terminal plates adapted and designed for correction of the electric field.

| Characteristic data of magnetron | New type 1 | New type 2 | E. G. Linder type |
|---|---|---|---|
| Diameter in millimeters | 7.4 | 6.4 | 4 |
| Length in millimeters | 20 | 10 | 3 |
| Number of segments | 8 | 12 | 2 |
| Wave length in centimeters | 16 | 10 | 10 |
| Potential in volts | 600 | 600 | 1000 |
| Magnetic field in Gauss units | 450 | 500 | 1400 |

This tabulation clearly shows the advantages inherent in magnetrons as here disclosed. It will, more particularly, be seen that for a higher frequency the magnetic field and the requisite potential are far lower. Further, the number of the anode segments may be chosen greater without any difficulties by virtue of their being mounted upon a disk.

Although this invention has been described more particularly in reference to magnetrons, it must be understood, as already pointed out above, that it applies equally to retarding-field or oscillating electron types of tubes, or, more broadly speaking, to all ultra-short wave oscillator, amplifier, and detector tubes.

We claim:

1. A magnetron oscillator system comprising a discharge tube having a centrally disposed linear cathode and a plurality of cylindrically formed anode segments coaxially surrounding said cathode, two end plates lying in planes perpendicular to the cathode axis, one half the number of anode segments being connected to one of said end plates, the other half of said anode segments being connected to the other end plate, a resonant circuit interconnecting the end plates, and a source of operating potentials connected to the cathode and to a point of symmetry on said resonant circuit.

2. A system according to claim 1 and having an antenna coupled through a Lecher wire transmission line to said resonant circuit.

3. An ultra-short wave circuit arrangement comprising a magnetron discharge tube having a centrally disposed linear cathode and surrounding cylindrically formed anode segments, a resonant circuit comprising a Lecher-wire system one of the conductors of which terminates in a flange interconnecting certain of said anode segments at one end thereof, the other of said conductors terminating in a second flange which interconnects the remainder of said anode segments, all of the anode segments being interposed between the planes of the two said flanges, and an operating potential source connected between the cathode and a point of symmetry on said resonant circuit.

4. An arrangement according to claim 3 and further characterized in that the anode segments connected to one flange are interleaved with the anode segments connected to the other flange.

HENRI GUTTON.
SYLVAIN BERLINE.